(12) United States Patent
Parantainen

(10) Patent No.: US 7,773,708 B2
(45) Date of Patent: *Aug. 10, 2010

(54) METHOD AND ARRANGEMENT FOR CHOOSING A CHANNEL CODING AND INTERLEAVING SCHEME FOR CERTAIN TYPES OF PACKET DATA CONNECTIONS

(75) Inventor: Janne Parantainen, Helsinki (FI)

(73) Assignee: Nokia Corporation, Espoo (FI)

( * ) Notice: Subject to any disclaimer, the term of this patent is extended or adjusted under 35 U.S.C. 154(b) by 55 days.

This patent is subject to a terminal disclaimer.

(21) Appl. No.: 12/257,635

(22) Filed: Oct. 24, 2008

(65) Prior Publication Data

US 2009/0046669 A1    Feb. 19, 2009

Related U.S. Application Data

(63) Continuation of application No. 09/595,275, filed on Jun. 15, 2000, now Pat. No. 7,447,287.

(30) Foreign Application Priority Data

Jun. 16, 1999   (FI) ........................... 991382

(51) Int. Cl.
*H04L 7/00* (2006.01)
(52) U.S. Cl. ..................... 375/354; 455/452.2
(58) Field of Classification Search ............. 375/219, 375/220, 227, 285, 295, 296
See application file for complete search history.

(56) References Cited

U.S. PATENT DOCUMENTS 6,167,031 A    12/2000  Olofsson et al.
6,208,663 B1   3/2001   Schramm et al.
6,308,082 B1   10/2001  Kronestedt et al.
6,501,748 B1   12/2002  Belaiche
6,507,567 B1 * 1/2003   Willars ...................... 370/321
6,553,006 B1   4/2003   Kalliokulju et al.
6,571,336 B1   5/2003   Smith
6,920,602 B1   7/2005   Park et al.

FOREIGN PATENT DOCUMENTS

WO       97/15131 A2    4/1997
WO       98/53576 A2    11/1998
WO       99/07170 A2    2/1999
WO       00/10357 A1    2/2000

* cited by examiner

*Primary Examiner*—Kevin Y Kim

(57) ABSTRACT

A method for choosing channel coding and/or interleaving scheme is applied in a communication connection over a radio interface between a terminal and a base station of a cellular packet radio system. A certain decision-making device allocates channel coding and/or interleaving schemes to communication connections. A request message is communicated (to the decision-making device, indicating a certain set of Quality of Service parameters associated with a certain first communication connection. The set of Quality of Service parameters is mapped to a certain first channel coding and/or interleaving scheme as a part of the channel coding and/or interleaving scheme allocation made by the decision-making device. The first channel coding and/or interleaving scheme is communicated to the base station and the terminal for them to apply said first channel coding and/or interleaving scheme in the first communication connection.

15 Claims, 4 Drawing Sheets

METHOD AND ARRANGEMENT FOR CHOOSING A CHANNEL CODING AND INTERLEAVING SCHEME FOR CERTAIN TYPES OF PACKET DATA CONNECTIONS

CROSS-REFERENCE TO RELATED APPLICATIONS

This application is a continuation of, claims priority to and the benefit of U.S. application Ser. No. 09/595,275, filed Jun. 15, 2000, now allowed, the disclosure of which is incorporated herein by reference in its entirety.

TECHNOLOGICAL FIELD

The invention concerns generally the technology of adapting, according to the needs of the current connection using a radio interface, the channel coding and other signal processing used in association with the radio interface. Especially the invention concerns the selection of channel coding and interleaving scheme associated with a radio interface for packet data communications. As an example of a communication system employing such a radio interface we will consider the General Packet Radio Service or GPRS system which is under specification at the priority date of this patent application. The invention is equally well applicable for example to the Universal Mobile Telecommunication System or UMTS, where a connectionless mode has been defined for packet data communication.

BACKGROUND OF THE INVENTION

The current version of the standardized GPRS system contains four mutually alternative channel coding schemes, which are known as CS-1, CS-2, CS-3 and CS-4. Error correction is based on retransmissions, meaning that the receiving device must acknowledge successfully received packets. Retransmission of unacknowledged packets is attempted until the reception is successful or the packets must be discarded due to a time limit. The decision of which channel coding scheme should be used in each communication connection is on the responsibility of the Packet Control Unit or PCU which is typically a part of the Base Station Subsystem or BSS; more particularly a PCU typically operates at the Base Station Controller or BSC, at the Base Transceiver Station or BTS (also known shortly as the Base Station or BS) or even at a Serving GPRS Support Node or SGSN. The channel coding scheme of a certain communication connection can be dynamically changed according to need. For example in a connection where frequent retransmissions of unsuccessfully received packets are observed it may be worthwhile to introduce a stronger channel coding scheme. Increasing the amount of channel coding lowers the throughput of actual data per packet, so when the connection quality is otherwise good it is advantageous to keep the amount of channel coding fairly low. All said GPRS channel coding schemes are associated with interleaving over a RLC block period (Radio Link Control) which is equal to the duration of four consecutive transmission frames.

The problem of the GPRS radio interface, as well as of many other radio interfaces for packet data communications, viewed in the context of the present invention, is that they are optimized for the transmission of data, meaning particularly the non-real time transmission of files and messages. This is understandable as such, because the packet-switched radio transmission systems have been regarded as logical extensions of wired networks for packet-switched communication between computers. Delay-critical applications such as the real-time transmission of speech and video have had their own circuit-switched transmission systems. Recently, however, applications have arisen that use the packet data networks for the real-time transmission of speech and even images. An example is the technology of Internet calls, where an audio and/or video telephone call is conducted through the Internet.

If we attempt to use the known GPRS radio interface or the known UMTS connectionless-based radio interface to conduct a telephone call or a real time video transmission, we are typically faced either with a relatively large number of retransmissions or a choice of strong channel coding. The former is contradictory to the requirement of real time and the latter lowers the throughput of actual data to an unacceptable level for the transmission of speech or images with a reasonable quality. The relatively short interleaving length makes the situation even worse, because it weakens the performance of the radio interface against bursty transmission errors.

An obvious solution for enhancing the applicability of packet data radio interfaces to the transmission of real time audio and/or video would be to specify at least one specific bearer type for them. Examples of channel coding and interleaving optimized for the transmission of real time audio and/or video are abundant in the field of digital mobile telephony, so the person skilled in the art would have no difficulties in specifying suitable characteristics for a "speech bearer" of the like in association with e.g. GPRS. However, it is not obvious how and when should it be decided to allocate such a bearer to a certain connection that is to be set up.

SUMMARY

The aspects of the disclosed embodiments present a method and an arrangement for choosing a channel coding and/or interleaving scheme for a packet data communication connection based on the requirements of that connection. It is a further object of the invention that it is flexibly applicable to different kinds of present and future connection types.

In one aspect, the requirements of a communication connection are defined in terms of a Quality of Service profile and by mapping the Quality of Service profiles into certain previously determined channel coding and/or interleaving schemes.

It is characteristic to the method according to the invention that it comprises the steps of communicating a request message to the decision-making device, said request message indicating a certain set of Quality of Service parameters associated with a certain first communication connection, mapping said set of Quality of Service parameters to a certain first channel coding and/or interleaving scheme as a part of the channel coding and/or interleaving scheme allocation made by the decision-making device and communicating said first channel coding and/or interleaving scheme to the base station and the terminal for them to apply said first channel coding and/or interleaving scheme in said first communication connection.

The invention applies also to an arrangement that comprises as characteristic features within a terminal and a base station, means for communicating a request message to a decision-making device, and means for indicating within said request message a certain set of Quality of Service parameters associated with a certain first communication connection, within the decision making device, means for mapping said set of Quality of Service parameters to a certain first channel coding and/or interleaving scheme as a part of the channel coding and/or interleaving scheme allocation and means for communicating said first channel coding and/or interleaving scheme to the base station and the terminal for them to apply said first channel coding and/or interleaving scheme in said first communication connection The concept of Quality of Service or QoS has been previously introduced to describe various kinds of service requirements or bearer capabilities in terms of a number of parameters. Typical QoS parameters include but are not limited to mean delay, maximum delay, service precedence, bearer class, mean bitrate, maximum bitrate, minimum bitrate and so on. A known step of setting up a new communication connection or updating the characteristics of an existing communication connection between a mobile station and a telecommunication network is a negotiation of QoS parameters, where the initiator or device requesting the setup or change of a connection suggests a certain set of QoS parameter values to be applied. The responder or other device taking part in the communication may answer by either accepting the proposed QoS parameter values or announcing the "best possible" set of values which it can offer at the moment, whereby it is on the responsibility of the initiator to either go on with the connection setup/change process or to terminate it.

According to the invention the known procedure of QoS negotiation is utilized and extended so that there exists a certain correspondence between a set of QoS parameter values and a predetermined channel coding and/or interleaving scheme. The device which requests the setup of a new communication connection or a change in an existing communication connection chooses the set of QoS parameter values to be suggested in the QoS negotiation process so that they take into account the real time/non-real time nature of the desired connection as well as other features that may affect the choice of an optimal channel coding and/or interleaving scheme. For example there may be certain known QoS parameter value combinations indicating voice traffic, interactive video or non-real time data. The selected QoS parameter value combinations are communicated to the device which decides the applied channel coding and/or interleaving schemes. A certain mapping has been determined for this device so that based on the communicated parameter values the device is able to choose the optimal channel coding and/or interleaving scheme for each connection.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
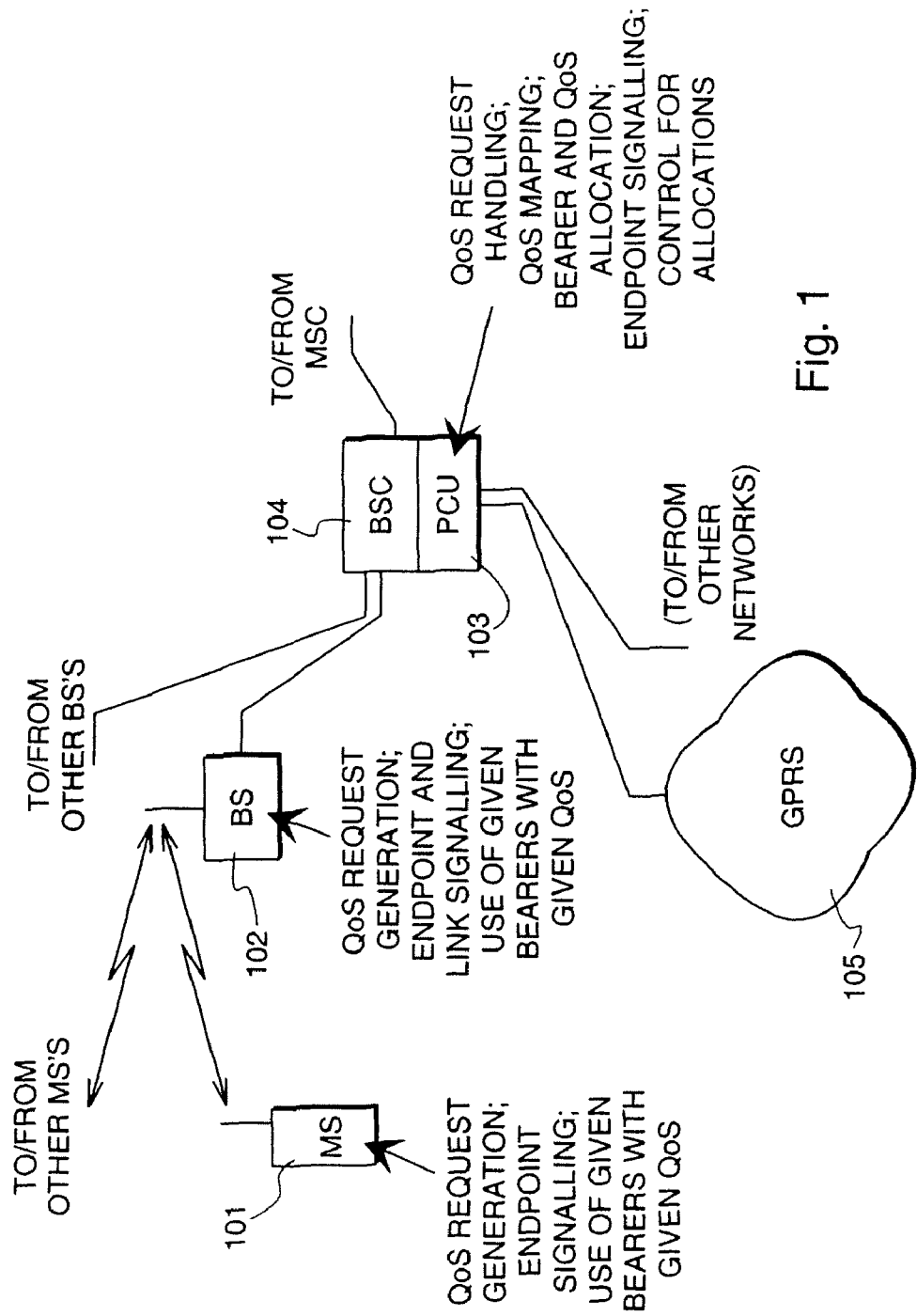
FIG. 1 illustrates a network-level arrangement according to the invention.

FIG. 1 illustrates an arrangement consisting of a mobile station or MS 101, a base station or BS 102, a packet control unit or PCU 103 coupled to a base station controller or BSC 104, a GPRS network 105 as well as a number of connections from said devices to other parts of the telecommunication system. There is a radio interface between the MS 101 and the BS 102, a wired connection and/or e.g. a directional microwave link between the BS 102 and the BSC 104 and a wired or optical fibre connection between the PCU 103 and the GPRS network 105. With a GPRS network we mean a widespread arrangement of mutually interconnected computers comprising a number of Serving GPRS Support Nodes (SGSNs) and Gateway GPRS Support Nodes (GGSNs) operating in accordance with the known GPRS specifications. The hardware of all parts shown in FIG. 1 is known as such. The arrangement of FIG. 1 is shown as an exemplary collection of hardware that can be used for implementing the present invention. It should be noted that the invention is in no way limited by the terminology used in association with FIG. 1: for example in the third-generation UMTS digital cellular network (Universal Mobile Telecommunication System) the concept of RANs or Radio Access Networks is introduced where a radio network controller or an RNC performs functions essentially similar to those of the BSC 104, and the mobile station is known as the User Equipment or UE.

It is known from prior art that an MS is capable of generating requests for setting up new bearers over the radio interface and in some cases for redefining the characteristics of existing bearers. It is likewise known from prior art that such a request may comprise, within appropriate fields, a selection of QoS parameter values which the MS would like the new or redefined bearer to have. According to an advantageous embodiment of the invention the MS 101 is arranged to select the QoS parameter values that it will send within a request of the mentioned type in a specific way: when the MS 101 knows that the new or redefined bearer is going to be used for certain type of transmission, e.g. for voice traffic, interactive video or non-real time data, it selects a previously determined set of QoS parameter values which the device responsible for allocating bearers and/or selecting channel coding and interleaving schemes is able to recognize as an indication of the expected use of the bearer that is to be set up or redefined.

The MS 101 is further capable of endpoint signalling, which means that it may communicate bidirectionally with the other network devices through the signalling channels defined in the system. Naturally the MS 101 is also arranged to use the bearers allocated to it with the QoS accompanied with the allocation, as long as the allocations do not exceed the inherent communication capabilities of the MS. These are all known functions from prior art.

The BS 102 has usually a limited role in bearer setup or redefinition: it simply implements the bearer setup and redefinition commands it receives from the BSC 104 and/or the PCU 103. However, in some systems the BS 102 may be capable of requesting bearer setup or redefinition of its own motion. In such systems the application of the present invention means that when the BS generates a request for bearer setup or redefinition, it selects the QoS parameter values that it will send within the request so that the device responsible for allocating bearers and/or selecting channel coding and interleaving schemes is able to recognize as an indication of the expected use of the bearer that is to be set up or redefined. The BS 102 is also capable of acting as an endpoint and as a link in signalling.

In the present description we will assume that the PCU 103 is the device which is responsible for handling the requests for bearer setup and redefinition and making the decisions concerning the allocation of bearers over the radio interface as well as the characteristics of the bearers. The actual QoS negotiation where the QoS profile is agreed upon is typically performed between a mobile station and an SGSN. According to the preferred embodiment of the invention the PCU is capable of QoS mapping, which means that there exists an unequivocal correspondence between certain selections of QoS parameter values and certain channel coding and/or interleaving schemes. When the PCU 103 receives a request for bearer setup or redefinition, it takes the QoS parameter values contained within the request, maps them into a certain channel coding and/or interleaving scheme and includes those in the bearer allocation, taken that there is enough available capacity in the system for the allocation to be made in the first place.

It may also happen that the QoS parameter values contained within the request indicate a bearer type which is not allocatable for the moment, but a certain other bearer type could be allocated. In such case it is advantageous if the PCU may make a preliminary allocation for a bearer that is as close in type as possible to the requested one, and answer the device requesting the bearer setup or redefinition with that allocation. It is then on the responsibility of the device that made the request to either accept the allocation even if it was not quite the same which was requested, or to reject the allocation and leave the situation as it is. To accomplish this for example the MS must contain a certain "reverse mapping" function with which it may take a certain bearer allocation with a certain choice of channel coding and/or interleaving and to interpret it as an indication of the allocated bearer type. The final decision of whether or not to accept the allocation may even be referred to the user of the MS: if the user had requested a video connection to be set up and nothing better than a normal telephone connection is available, the MS may ask the user whether he is satisfied with a normal telephone connection or whether the attempts for establishing a connection should be terminated altogether.

Figure 2:
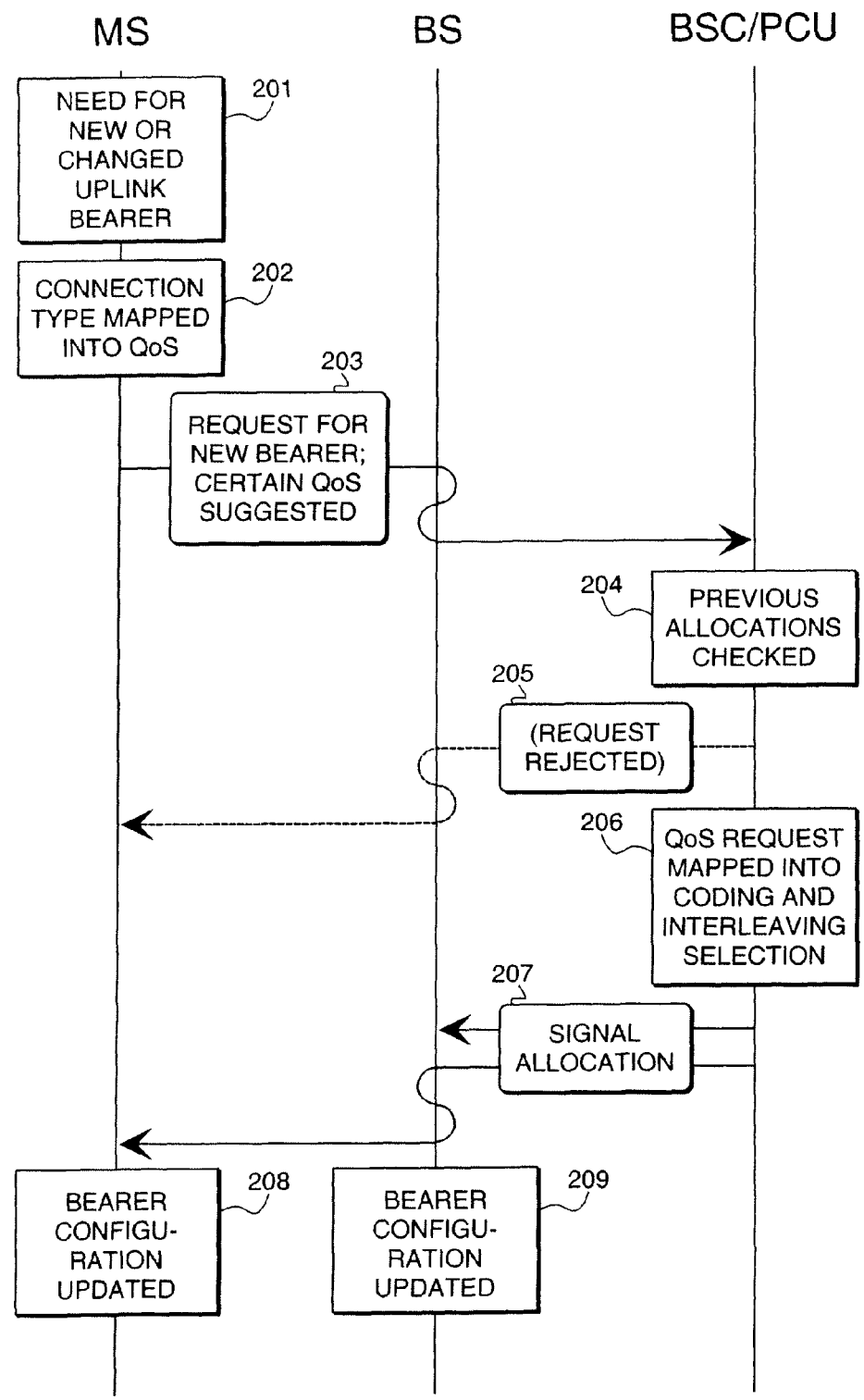
FIG. 2 illustrates a first aspect of a method according to the invention.

FIG. 2 illustrates schematically the flow of events in an uplink bearer setup or redefinition process according to an advantageous embodiment. At step 201 the MS recognizes the need for setting up a new bearer or for redefining the characteristics of an existing one. At step 201 the MS is aware of the type of the bearer which is needed: as exemplary bearer types we have given voice traffic, interactive video or non-real time data above. At step 202 the MS maps the bearer type into a certain predefined set of QoS parameter values. The MS sends a request for new bearer (or for the redefinition of an existing bearer) 203 in a manner basically known as such; however the selection of QoS parameter values in the request now signify the type of the requested bearer instead of or in addition to the plain bearer characteristics normally referred to by QoS parameter values of prior art.

The request 203 is routed over the BS to the BSC, where it is found to concern packet data services and consequently routed into the PCU. After having received the request the PCU checks at step 204 the allocation situation of the resources available to packet data services. It may happen that a too large part of the resources are already allocated or some other rule prevents the allocation altogether, in which case the PCU answers the MS simply with a rejection message 205 and the process is terminated. In a hopefully more typical case the PCU goes on to map the set of QoS parameters in the request into a certain bearer type, meaning especially a selection of channel coding and interleaving.

The step of negotiating a QoS profile is not shown in FIG. 2. It typically involves the SGSN which is the peer of the MS in the QoS negotiation. The SGSN may ask the PCU or other network element about the possibility of allowing a certain QoS profile to be used, taken the capacity and current traffic load situation of a certain BS and/or BSC. If such a request is made and the PCU gives its approval, the SGSN conducts the negotiation to its end in a known way, after which it is on the responsibility of the PCU to use the negotiated QoS profile for mapping it into a certain channel coding and/or interleaving scheme.

The step of communicating a request message to the PCU, step 203, may further comprises the mutually alternative substeps of:

a1) indicating, within said set of Quality of Service parameters, high service precedence, short mean delay and short maximum delay when the request message concerns a certain communication connection for transmitting real-time speech and/or real-time video image, or a2) indicating, within said set of Quality of Service parameters, low service precedence, long mean delay and long maximum delay when the request message concerns a certain communication connection for transmitting non-real time data.

In the step of mapping, step 206, said set of Quality of Service parameters to a certain first channel coding and/or interleaving scheme comprises the mutually alternative substeps of:

b1) mapping a set of Quality of Service parameters indicating high service precedence, short mean delay and short maximum delay into a channel coding scheme with no retransmissions and a long interleaving length, or b2) mapping a set of Quality of Service parameters indicating low service precedence, long mean delay and long maximum delay into a channel coding scheme with retransmissions and a short interleaving length.

Step b1) above may further comprises the feature of mapping said set of Quality of Service parameters indicating high service precedence, short mean delay and short maximum delay into a channel coding scheme which is optimized for speech.

Taken the current set of available channel coding alternatives in GPRS, it would be advantageous if additional optimized channel coding schemes would be developed for at least speech and possibly also for real time video. The invention does not limit the actual selection of channel coding methods, but it is known to be advantageous to avoid retransmissions in a speech bearer and to have variable strengths of channel coding for the different parts of a transmission burst. Additionally it is known to be advantageous to have a relatively long interleaving length for speech or real time video: for example the duration of eight or ten transmission frames.

When the PCU has made the allocation for the requested bearer and decided the channel coding and interleaving schemes it signals the allocation to the BS and the MS as illustrated with 207. At this moment the device which requested the bearer setup or redefinition still has the chance to reject the allocation, which mainly applies to cases where the PCU was not able to grant the allocation in its requested form but offers an alternative allocation instead. If the MS accepts the allocation it performs bearer reconfiguration at step 208 more or less simultaneously with a similar operation 209 in the BS, after which the communication continues by using the newly allocated or redefined bearer.

Informing the BS about the channel coding/interleaving scheme to be applied may take place by for example using a certain bit field within a RLC/MAC header (Radio Link Control/Medium Access Control) to indicate a value which the BS is able to unequivocally translate into a certain channel coding/interleaving scheme. The use of a certain channel coding/ interleaving scheme may also be stored in the BS according to a certain data flow (TBF, Temporary Block Flow) for a certain user.

Figure 3:
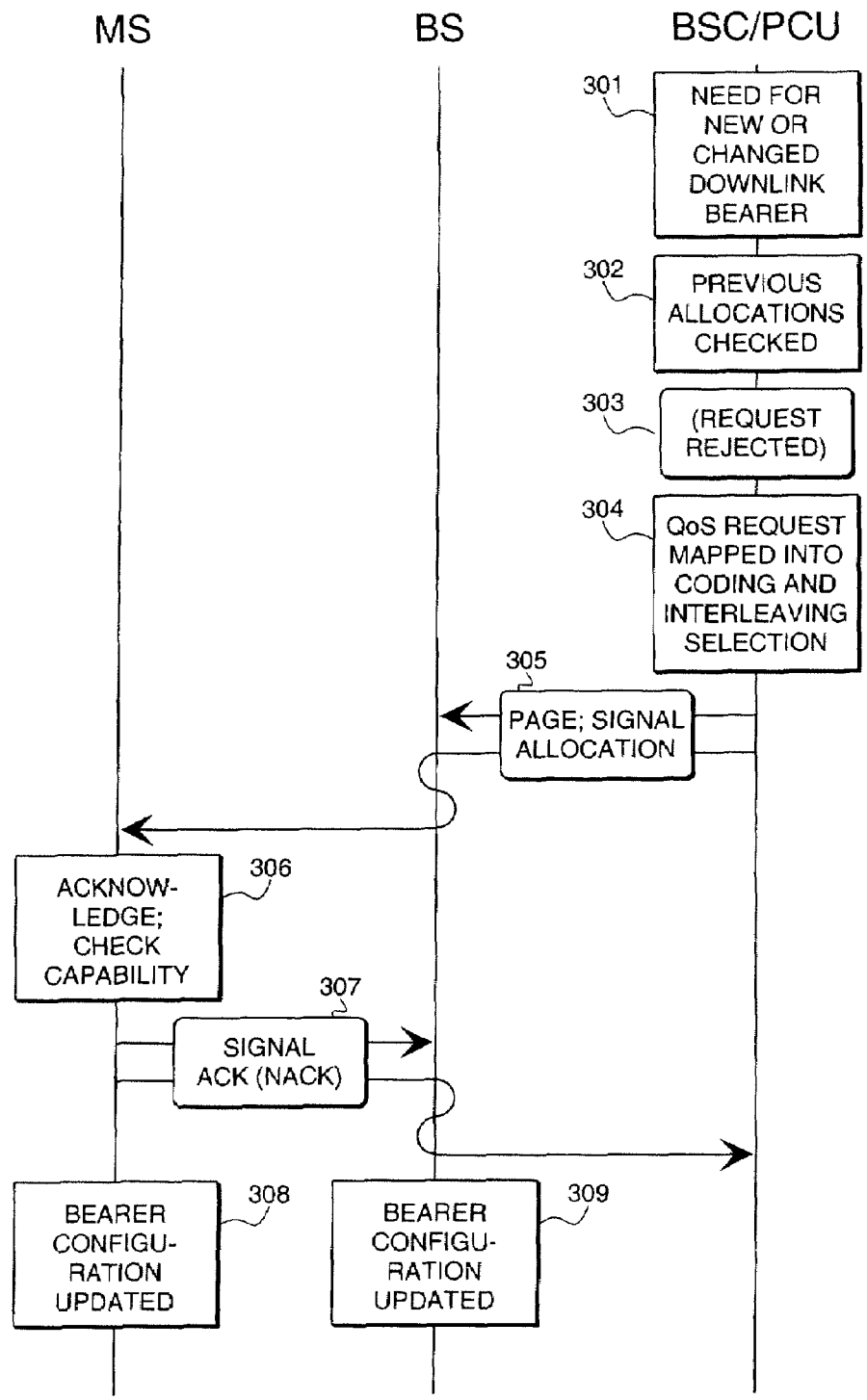
FIG. 3 illustrates a second aspect of a method according to the invention.

FIG. 3 is the downlink bearer counterpart of FIG. 2. At step 301 the PCU receives from the network a request concerning a communication connection to a certain mobile station such that a new bearer has to be set up or an existing bearer must be redefined. Step 302 corresponds to step 204 in FIG. 2 and it may result in the request to be rejected at step 303. If that is not the case the PCU should again find the correct channel coding and/or interleaving scheme for the requested bearer at step 304. If the request contained a predefined set of QoS parameter values, step 304 resembles closely step 206 in FIG. 2. It is also possible that the request indicates in some other way that it concerns a communication connection the type of which is e.g. voice traffic, interactive video or non-real time data. In that case the mapping function in the PCU should be flexible enough to recognize also such other kinds of indications when they come from the network side.

Having made the allocation with the associated selection of channel coding and interleaving scheme the PCU signals the allocation by paging the MS through the BS (or a number of BSs) at step 305. The term paging may be replaced with signalling if the MS is already actively communicating with the PCU so that its location in a certain cell is known and it is in an active state. The MS receives the paging and allocation at step 306 and checks whether or not the intended new bearer is within its capabilities. At step 307 it signals either its acknowledgement or rejection (negative acknowledgement) to the PCU through the BS, and if the acknowledgement was positive, communication with the new bearer may start after bearer configuration update in the MS 308 and the BS 309.

A major advantage of the invention is that existing information structures (i.e. the QoS parameter values) are used to signal requested bearer type to the PCU or other device that makes the decisions concerning bearer allocation and selection of channel coding and interleaving. We have already indicated that it would be advantageous to define at least one additional channel coding scheme and probably also one additional interleaving length in systems like GPRS where the existing channel coding schemes and interleaving lengths are far from optimal for the transmission of speech or real time video. That would obviously necessitate some new definitions to be made in the information structures that the PCU or corresponding device uses to signal the selected channel coding and interleaving schemes to the BSs and MSs. If only one additional interleaving length is defined, it suffices to define one additional bit in a signalling structure like the known PCU extended data frame header: a first value of said additional bit signifies the known interleaving length of one RLC block an second value of said additional bit signifies the new additionally defined interleaving length which can be e.g. two RLC blocks which is equal to eight transmission bursts. If one or several additional channel coding schemes are defined, other additional bits to e.g. the PCU extended data frame header must be defined.

Figure 4:
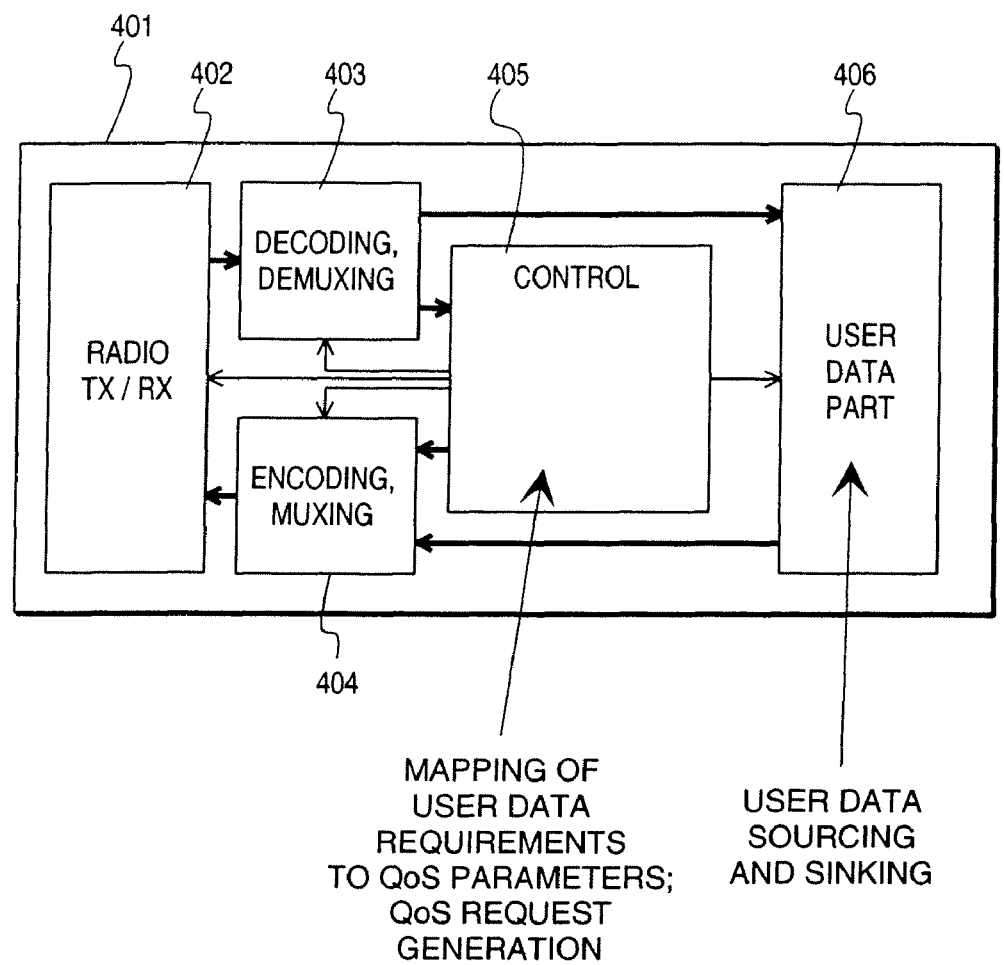
FIG. 4 schematically illustrates a mobile station according to the invention.

FIG. 4 illustrates schematically a mobile station 401 that can be used to implement the method according to the invention. The hardware of the mobile stations comprises a radio transceiver block 402, a decoding/demultiplexing block 403, an encoding/multiplexing block 404, a control block 405 and a user data part 406. The decoding/demultiplexing block 403 is arranged to separate received signalling information from received user data and to direct the former into the control block 405; similarly the encoding/multiplexing block 404 is arranged to take signalling information from the control block 405 and to multiplex it for transmission with user data coming from the user data part 406. All other blocks operate under the supervision of the control block. The control connections are shown with thinner lines than the user data and signalling information connections. To make the mobile station to operate in accordance with the invention the functions of mapping user data requirements to QoS parameter values, possibly the reverse mapping of negotiated QoS parameter values into bearer types and the handling of bearer allocation requests is programmed into the form of processor-executable instructions so that the control block 405 is able to operate according to them.

The invention claimed is:

1. A method comprising:
receiving a request for a specific communication connection over a radio interface between a mobile station and a base station of a cellular packet radio system;
as part of said requesting a specific communication connection, receiving a request message, said request message indicating a need for setting up a new radio bearer between the mobile station and the base station or changing the characteristics of an existing radio bearer between the mobile station and the base station, said request message further indicating a certain set of desired Quality of Service parameters selected based on an expected use of said specific communication connection, to be associated with said requested specific communication connection,
allocating a channel coding and/or interleaving scheme for independent application to said specific communication connection based, at least in part, on said desired Quality of Service parameters;
mapping said desired set of Quality of Service parameters to said allocated channel coding and/or interleaving scheme as a part of the allocation of the channel coding and/or interleaving scheme; and
transmitting a communication of said allocated channel coding and/or interleaving scheme to the base station and the mobile station for them to independently apply said first channel coding and/or interleaving scheme for use in said specific communication connection.

2. The method of claim 1 further comprising that the channel coding scheme is a combination of error detection, error correcting, and interleaving.

3. A method according to claim 1, wherein communicating a request message is executed as a response to an observed need for setting up a new radio bearer between the mobile station and the base station.

4. The method of claim 3 further comprising that the request message is communicated from a serving gateway.

5. A method according to claim 1, wherein communicating a request message is executed as a response to an observed need for changing the characteristics of an existing radio bearer between the mobile station and the base station.

6. A method comprising:
receiving a request message at a decision-making device that allocates channel coding and/or interleaving schemes to communication connections over a radio interface between mobile stations and base stations of a cellular packet radio system, said request message indicating a need for setting up a new radio bearer between a mobile station and a base station or changing the characteristics of an existing radio bearer between the mobile station and the base station and indicating a certain set of Quality of Service parameters associated with a certain first communication connection;
mapping said set of Quality of Service parameters to a certain first channel coding and/or interleaving scheme as a part of the connection-specific channel coding and/or interleaving scheme allocation made by the decision-making device; and transmitting a communication of said first channel coding and/or interleaving scheme to the base station and the mobile station for them to apply said first channel coding and/or interleaving scheme in said first communication connection;

wherein the step of receiving a request message at the decision-making device further comprises:

a1) receiving an indication, within said set of Quality of Service parameters, of high service precedence, short mean delay and short maximum delay when the request message concerns a certain communication connection for transmitting real-time speech and/or real-time video image, or a2) receiving an indication, within said set of Quality of Service parameters, of low service precedence, long mean delay and long maximum delay when the request message concerns a certain communication connection for transmitting non-real time data;

and wherein mapping said set of Quality of Service parameters to a certain first channel coding and/or interleaving scheme comprises:

b1) mapping the set of Quality of Service parameters indicating high service precedence, short mean delay and short maximum delay into a channel coding scheme with no retransmissions and a long interleaving length, or b2) mapping the set of Quality of Service parameters indicating low service precedence, long mean delay and long maximum delay into a channel coding scheme with retransmissions and a short interleaving length.

7. A method according to claim 6, wherein b1) further comprises the feature of mapping said set of Quality of Service parameters indicating high service precedence, short mean delay and short maximum delay into a channel coding scheme which is optimized for speech.

8. An apparatus comprising:

a decision-making device configured to allocate channel coding and/or interleaving schemes to communication connections;

a controller configured to receive requests for specific communication connections with base stations and mobile stations over a radio interface, said requests for specific communication connections including a request message to the decision-making device, said request message indicating a need for setting up a new radio bearer between a mobile station and a base station or changing the characteristics of an existing radio bearer between the mobile station and the base station, said request message further indicating a certain set of desired Quality of Service parameters based on an expected use of said specific communication connection, to be associated with said requested specific communication connection;

wherein the decision making device is configured to allocate a channel coding and/or interleaving scheme for independent application to said requested specific communication connection based, at least in part, on said desired Quality of Service parameters, and is further adapted to map said desired Quality of Service parameters to said allocated channel coding and/or interleaving scheme as a part of the allocation of the channel coding and/or interleaving scheme; and wherein said controller is configured to transmit a communication of said allocated coding and/or interleaving scheme to the base station and the mobile station for them to independently apply said allocated channel coding and/or interleaving scheme for use in said specific communication connection.

9. The apparatus of claim 8, wherein the apparatus comprises a network node of a wireless communications network.

10. The apparatus of claim 9, wherein the apparatus comprises a radio network controller.

11. The apparatus of claim 9 wherein the apparatus comprises a packet control unit.

12. The apparatus of claim 8 wherein the controller is configured to receive the request from serving gateways.

13. The apparatus of claim 7 wherein the apparatus is further configured to cause the QOS parameters to be negotiated between the mobile station and a SGSN.

14. The apparatus of claim 13 wherein the SGSN is configured to ask the decision making unit about allowing a certain QOS profile to be used, based on capacity and current traffic load.

15. The apparatus of claim 7 wherein the decision-making device is further configured to identify QOS parameter values that indicate a bearer type that is not allocatable and to make a preliminary allocation of a pair that is close in type to the requested one.

* * * * *